US012793987B2

(12) United States Patent
Kim et al.

(10) Patent No.: US 12,793,987 B2
(45) Date of Patent: Nov. 10, 2026

(54) MEMBRANE-ELECTRODE ASSEMBLY AND FUEL CELL COMPRISING SAME

(71) Applicant: KOLON INDUSTRIES, INC., Seoul (KR)

(72) Inventors: Jung Ho Kim, Seoul (KR); Gyong Bum Ko, Seoul (KR); Jun Young Kim, Seoul (KR); Sang Il Lee, Seoul (KR); Kah Young Song, Seoul (KR); Dong Jun Cho, Seoul (KR); Nak Won Kong, Seoul (KR); Hyeong Su Kim, Seoul (KR); Kyoung Sik Nam, Seoul (KR); Ju Sung Lee, Seoul (KR); Chan Mi Park, Seoul (KR); Sun Young Jeong, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 683 days.

(21) Appl. No.: 18/258,337

(22) PCT Filed: Nov. 30, 2021

(86) PCT No.: PCT/KR2021/017896
§ 371 (c)(1),
(2) Date: Jun. 20, 2023

(87) PCT Pub. No.: WO2022/145748
PCT Pub. Date: Jul. 7, 2022

(65) Prior Publication Data

US 2024/0030460 A1 Jan. 25, 2024

(30) Foreign Application Priority Data

Dec. 31, 2020 (KR) ........................ 10-2020-0189941

(51) Int. Cl.
*H01M 4/86* (2006.01)
*H01M 4/88* (2006.01)
(Continued)

(52) U.S. Cl.
CPC ....... *H01M 4/8668* (2013.01); *H01M 4/8657* (2013.01); *H01M 4/88* (2013.01);
(Continued)

(58) Field of Classification Search
CPC .... H01M 4/8668; H01M 4/8657; H01M 4/88; H01M 4/926; H01M 4/86; H01M 4/8652;
(Continued)

(56) References Cited

U.S. PATENT DOCUMENTS

2005/0136308 A1* 6/2005 Andrews ................. H01M 4/90 429/465
2007/0212593 A1* 9/2007 Raiford ............... H01M 8/0289 429/534

(Continued)

FOREIGN PATENT DOCUMENTS

CN 101222049 A 11/2012
CN 109417180 A 3/2019

(Continued)

OTHER PUBLICATIONS

The EP Extended European Search Report, dated Jul. 18, 2025.

*Primary Examiner* — Matthew W Van Oudenaren
(74) *Attorney, Agent, or Firm* — Harvest IP Law, LLP

(57) ABSTRACT

Provided is a membrane-electrode assembly having improved binding strength between a polymer electrolyte membrane and a catalyst layer and improved durability of the catalyst layer. An embodiment of the present invention provides a membrane-electrode assembly including a polymer electrolyte membrane and a catalyst layer disposed on at least one surface of the polymer electrolyte membrane,
(Continued)

wherein the catalyst layer contains a first composite and a second composite; the first composite contains a first catalyst containing a support and first metal particles supported on the support, and a first ionomer coated on the surface of the first catalyst; the second composite contains a second catalyst that contains second metal particles and is not supported on a support, and a second ionomer that is not coated on the surface of the second catalyst; and the first ionomer and the second ionomer are identical with or different from each other.

11 Claims, 12 Drawing Sheets

(51) Int. Cl.

| | |
|---|---|
| ***H01M 4/90*** | (2006.01) |
| ***H01M 4/92*** | (2006.01) |
| ***H01M 8/10*** | (2016.01) |
| ***H01M 8/1004*** | (2016.01) |
| ***H01M 8/1018*** | (2016.01) |

(52) U.S. Cl.
CPC .......... *H01M 4/926* (2013.01); *H01M 4/928* (2013.01); *H01M 8/1004* (2013.01); *H01M 4/881* (2013.01); *H01M 4/9075* (2013.01); *H01M 4/9083* (2013.01); *H01M 4/9091* (2013.01); *H01M 4/925* (2013.01); *H01M 8/1018* (2013.01); *H01M 2008/1095* (2013.01)

(58) Field of Classification Search
CPC .. H01M 4/881; H01M 4/8828; H01M 4/9075; H01M 4/9083; H01M 4/9091; H01M 4/925; H01M 4/928; H01M 8/1004; H01M 8/1018; H01M 2008/1095
See application file for complete search history.

(56) References Cited

U.S. PATENT DOCUMENTS

| | | | | |
|---|---|---|---|---|
| 2007/0213203 | A1* | 9/2007 | Sompalli ............ | H01M 4/8814 502/101 |
| 2007/0269699 | A1 | 11/2007 | Pak | |
| 2013/0157169 | A1* | 6/2013 | Madden ............. | H01M 4/8828 429/535 |

FOREIGN PATENT DOCUMENTS

| | | | |
|---|---|---|---|
| JP | 2012123927 | A | 6/2012 |
| JP | 2016081624 | A | 5/2016 |
| KR | 100738062 | B1 | 7/2007 |
| KR | 20180076907 | A | 7/2018 |
| KR | 20190000805 | A | 1/2019 |
| KR | 20190032199 | A | 3/2019 |
| KR | 20200001492 | A | 1/2020 |
| WO | 2020-004848 | A1 | 1/2020 |

* cited by examiner

MEMBRANE-ELECTRODE ASSEMBLY AND FUEL CELL COMPRISING SAME

CROSS REFERENCE TO RELATED APPLICATION

This application is a National Stage filing under 35 U.S.C. 371 of International Application No. PCT/KR2021/017896, filed on Nov. 30, 2021, and claims priority to Korean Patent Application No. 10-2020-0189941, filed on Dec. 31, 2020, the disclosures of which is incorporated herein by reference in its entirety.

TECHNICAL FIELD

The present invention relates to a membrane-electrode assembly and a fuel cell comprising same. More particularly, the present invention relates to a membrane-electrode assembly in which durability of a catalyst is enhanced and the binding strength and durability of the polymer electrode membrane catalyst layer interface are improved, by directly coating a catalyst layer on a polymer electrode membrane, the catalyst layer including a first composite composed of a catalyst that is supported on a support and an ionomer and a second composite composed of a catalyst that is not supported on a support and an ionomer, and to a fuel cell including this membrane-electrode assembly.

BACKGROUND ART

Fuel cells are power generation systems that convert chemical reaction energy of hydrogen and oxygen contained in hydrocarbon-based materials such as methanol, ethanol, and natural gas, directly to electrical energy. A representative example of such fuel cells may be a Polymer Electrolyte Membrane Fuel Cell (PEMFC). PEMFCs are spotlighted as a next-generation energy source, and research for commercialization of PEMFC is in active progress particularly in the fields related to automobiles due to advantages such as environmental-friendly impression.

A Membrane-Electrode Assembly (MEA) that substantially generates electricity in a fuel cell system has a structure in which an anode electrode (also referred to as “fuel electrode” or “oxidation electrode”) and a cathode electrode (also referred to as “air electrode” or “reduction electrode”) are disposed, with a polymer electrolyte membrane containing a hydrogen ion conductive polymer interposed therebetween.

Each composition for forming an electrode is composed of a catalyst, an ionomer, a solvent, and additives, and the catalyst among the above-described constituent elements is an important factor that determines the activity and durability of the fuel cell. As a platinum-based catalyst used in the oxidation electrode (Anode) and the reduction electrode (Cathode), a Pt/C catalyst obtained by supporting platinum nanoparticles on a carbon support having a large specific surface area and excellent electrical conductivity is most widely used.

However, as the effective specific surface area of a catalyst increases, the activity of the catalyst is improved, and for this purpose, the amount of use of a supported catalyst can be increased. However, in this case, the amount of the carbon support used is increased together, and the thickness of the battery is also increased along therewith, so that there occur problems such as an increase in the internal resistance of the battery and difficulties in forming an electrode. Furthermore, since a Pt/C catalyst is produced using pure platinum, which is a highly expensive metal, there is limitation in reducing the price of catalysts, and as oxygen is adsorbed onto the platinum surface as a result of an oxygen reduction reaction of the reduction electrode and causes generation of platinum oxide, a significant amount of energy loss occurs due to an overvoltage generated, which holds up commercialization.

On the other hand, among a variety of technologies that are being developed for fuel cell commercialization, a direct coating technology of directly coating a polymer electrolyte membrane with an electrode is attracting attention as a new MEA production technology for commercialization of fuel cells. Representative examples of the direct coating technology include methods such as slot die coating and spray coating. However, in order to effectively realize direct coating, it is essential to develop an electrode composition for direct coating that can improve the interface binding strength between a polymer electrolyte membrane and a catalyst layer, together with a technology for handling a polymer electrolyte membrane. Accordingly, research has been continuously conducted to improve the interface binding strength between a polymer electrolyte membrane and a catalyst layer.

DISCLOSURE OF INVENTION

Problem to be Solved by the Invention

An object of the present invention is to provide a membrane-electrode assembly in which durability of a catalyst layer is enhanced by directly coating a catalyst layer containing a first composite composed of a catalyst supported on a support and an ionomer, on a polymer electrolyte membrane.

Another object of the present invention is to provide a membrane-electrode assembly in which the interface binding strength between a polymer electrolyte membrane and a catalyst layer and the durability are improved and hydrogen ion transfer is facilitated, by directly coating a catalyst containing a second composite composed of a catalyst that is not supported on a support and an ionomer, on a polymer electrolyte membrane.

Still another object of the present invention is to provide a membrane-electrode assembly that secures economic efficiency by producing a second composite in which a catalyst that is not supported on a support, which is usually not used, is dispersed in an ionomer.

An object of the present invention other than the above-described objects is to provide a fuel cell including the above-described membrane-electrode assembly.

The objects of the present invention are not intended to be limited to the objects mentioned above, and other objects and advantages of the present invention that are not mentioned herein will be understood by the following description and will be understood more clearly by the embodiments of the present invention. Furthermore, it will be easily understood that the objects and advantages of the present invention can be realized by the means shown in the claims and combinations thereof.

Means for Solving Problem

An embodiment of the present invention for achieving the above-described objects is a membrane-electrode assembly including:

a polymer electrolyte membrane; and a catalyst layer disposed on at least one surface of the polymer electrolyte membrane, wherein the catalyst layer contains a first composite and a second composite, the first composite contains a support, a first catalyst that is supported on the support and contains first metal particles, and a first ionomer coated on the surface of the first catalyst, the second composite contains a second catalyst that contains second metal particles and is not supported on a support, and a second ionomer that is not coated on the surface of the second catalyst, and the first ionomer and the second ionomer are identical with or different from each other.

Another embodiment of the present invention for achieving the above-described objects is a method for producing a catalyst layer for direct coating, the method including:

a step of centrifuging a synthesized catalyst solution to separate a support and a first catalyst supported on the support from a second catalyst that is not supported on a support;

a step of homogeneously mixing the support and the first catalyst supported on the support with a first ionomer solution and dispersing these components to form a first homogeneous mixture;

a step of adding a second homogeneous mixture obtained by adding the second catalyst to a second ionomer solution and homogeneously mixing the the two, to the first homogeneous mixture to form a third homogeneous mixture; and a step of dispersing the third homogeneous mixture to form a coating composition.

Still another embodiment of the present invention for achieving the above-described objects is a method for producing a membrane-electrode assembly, the method including:

a step of providing a polymer electrolyte membrane;

a step of directly coating at least one surface of the polymer electrolyte membrane with the above-described coating composition; and a step of drying the polymer electrolyte membrane having the coating composition coated thereon.

More particularly, the above-described method for producing a coating composition includes:

a step of centrifuging a synthesized catalyst solution to separate a support and a first catalyst supported on the support from a second catalyst that is not supported on a support;

a step of homogeneously mixing the support and the first catalyst supported on the support with a first ionomer solution and dispersing these components to form a first homogeneous mixture;

a step of adding a second homogeneous mixture obtained by adding the second catalyst to a second ionomer solution and homogeneously mixing the two, to the first homogeneous mixture to form a third homogeneous mixture; and a step of dispersing the third homogeneous mixture.

An embodiment of the present invention for achieving the above-described objects is a fuel cell including the above-described membrane-electrode assembly.

Effect of the Invention

According to the present invention, there can be provided a membrane-electrode assembly in which durability of a catalyst layer is enhanced and the interface binding strength between a polymer electrolyte membrane and a catalyst layer is improved, by directly coating a polymer electrolyte membrane with a catalyst layer containing a first composite composed of a catalyst that is supported on a support and an ionomer, and a second composite composed of a catalyst that is not supported on a support and an ionomer.

The above-described effects as well as specific effects of the present invention will be described together below while describing specific subject matters for carrying out the present invention.

BEST MODE(S) FOR CARRYING OUT THE INVENTION

Hereinafter, various configurations of the present invention will be described in more detail so that those having ordinary skill in the art to which the present is pertained can easily carry out the invention; however, these configurations are given for illustrative purposes only, and the scope of rights of the present invention is not limited by the following description.

An embodiment of the present invention provides a membrane-electrode assembly including a polymer electrolyte membrane and a catalyst layer disposed on at least one surface of the polymer electrolyte membrane, wherein the catalyst layer contains a first composite and a second composite; the first composite contains a support, a first catalyst that is supported on the support and contains first metal particles, and a first ionomer coated on the surface of the first catalyst; the second composite contains a second catalyst that contains second metal particles and is not supported on a support, and a second ionomer that is not coated on the surface of the second catalyst; and the first ionomer and the second ionomer are identical with or different from each other.

Hereinafter, configurations of the present invention will be described in more detail with reference to the drawings.

Figure 1:
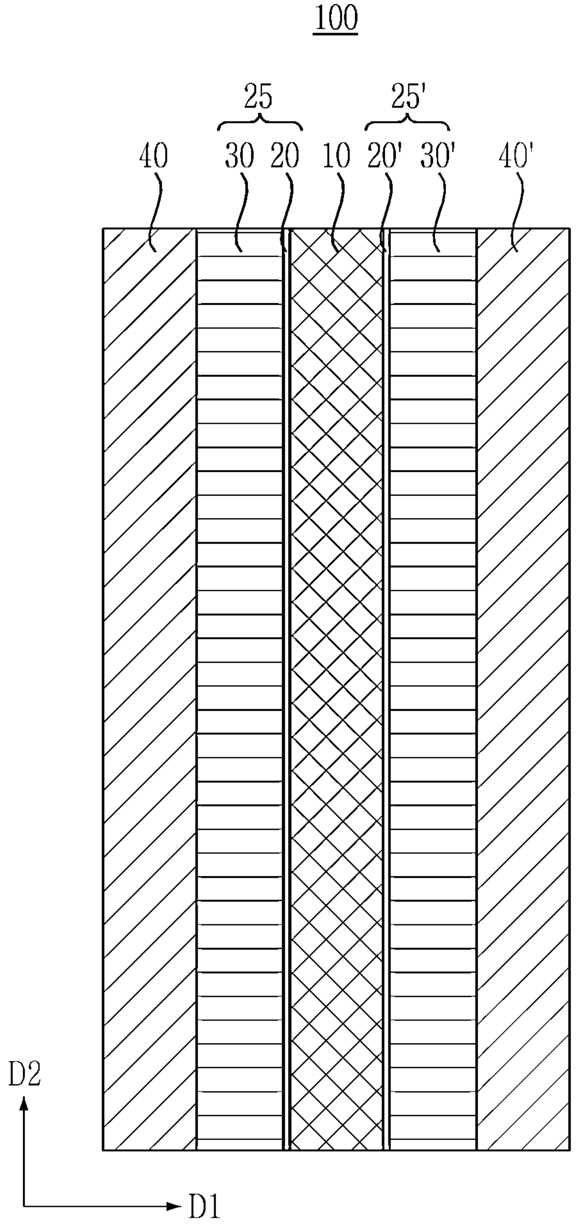
FIG. 1 is a cross-sectional view showing a membrane-electrode assembly according to an embodiment of the present invention.

FIG. 1 is a cross-sectional view showing a membrane-electrode assembly according to an embodiment of the present invention.

Referring to FIG. 1, a membrane-electrode assembly (100) according to the present invention may include a polymer electrolyte membrane (10), a first catalyst layer (25), a second catalyst layer (25'), a first gas diffusion layer (40), and a second gas diffusion layer (40').

The polymer electrolyte membrane (10) according to the present invention may contain an ion conductor. The ion conductor may be any one selected from the group consisting of a fluorine-based ionomer, a hydrocarbon-based ionomer, and a mixture of these.

The fluorine-based ionomer may be a fluorine-based polymer containing fluorine in a main chain having a cationic exchange group or an anionic exchange group, or a partially fluorinated polymer such as a polystyrene-graft-ethylene tetrafluoroethylene copolymer or a polystyrene-graft-polytetrafluoroethylene copolymer. Examples of the fluorine-based ionomer include fluorine-based polymers including poly(perfluorosulfonic acid), poly(perfluorocarboxylic acid), a copolymer of tetrafluoroethylene including a sulfonic acid group and fluorovinyl ether, defluorinated sulfurized polyether ketone, and mixtures thereof.

The cation exchange group is a functional group capable of transferring cations such as hydride ions, and examples include acidic groups such as a sulfonic acid group, a carboxyl group, a boronic acid group, a phosphoric acid group, an imide group, a sulfonimide group, and a sulfonamide group. The cation exchange group may be generally a sulfonic acid group or a carboxyl group.

The anion exchange group is a polymer capable of transporting anions such as hydroxy ion, carbonate or bicarbonate, and the anion exchange group is commercially available in the form of hydroxide or halide (generally chloride). The anion exchange group can be used for industrial water purification, metal separation, or a catalytic process.

As a polymer containing the anion exchange group, a polymer doped with a metal hydroxide can be generally used, and specifically, poly(ether sulfone), polystyrene, a vinyl-based polymer, poly(vinyl chloride), poly(vinylidene fluoride), poly(tetrafluoroethylene), poly(benzimidazole), poly(ethylene glycol), or the like, which are all doped with a metal hydroxide, can be used.

The hydrocarbon-based ionomer may be a hydrocarbon-based polymer having a cation exchange group or an anion exchange group. The hydrocarbon-based polymer may be, for example, a hydrocarbon-based polymer containing at least one selected from the group consisting of imidazole, benzimidazole, polyamide, polyamideimide, polyimide, polyacetal, polyethylene, polypropylene, an acrylic resin, polyester, polysulfone, polyether, polyetherimide, polyester, polyethersulfone, polyetherimide, polycarbonate, polystyrene, polyphenylene sulfide, polyether ether ketone, polyether ketone, polyaryl ether sulfone, polyphosphazene, and polyphenylquinoxaline, in the main chain.

Examples of the hydrocarbon-based ionomer include sulfonated polyimide (S-PI), sulfonated polyaryl ether sulfone (S-PAES), sulfonated polyether ether ketone (S-PEEK), sulfonated polybenzimidazole (S-PBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures of these; however, the technical scope of the present invention is not intended to be limited to these.

The polymer electrolyte membrane (10) according to the present invention may be in the form of a reinforced composite membrane in which pores of a porous support are filled with an ionomer, such as a fluorine-based porous support such as e-PTFE having a microstructure in which nodes are connected to each other by microstructures of polymer fibrils or by fibrils, or a porous nanoweb support produced by electrospinning or the like.

The polymer electrolyte membrane (10) according to the present invention may be disposed between the first catalyst layer (25) and the second catalyst layer (25'). In other words, the first catalyst layer (25) may be disposed on one surface of the polymer electrolyte membrane (10), and the second catalyst layer (25') may be disposed on the other surface of the polymer electrolyte membrane (10). Therefore, the first catalyst layer (25) or the second catalyst layer (25') may be disposed on at least one surface of the polymer electrolyte membrane (10).

According to the present specification, a first direction (D1) may be defined as the thickness direction of the membranes, and a second direction (D2) may be defined as a direction intersecting the first direction (D1). For example, the second direction (D2) may be a direction perpendicular to the first direction (D1).

The thickness of the polymer electrolyte membrane (10) may be 3 to 100 μm (micrometers) and may be preferably 5 to 20 μm (micrometers).

The first catalyst layer (25) according to the present invention can function as an anode at which hydrogen gas is delivered and hydrogen ions and electrons are generated. The second catalyst layer (25') according to the present invention may function as a cathode at which the hydrogen ions and the electrons are respectively delivered through the polymer electrolyte membrane (10) and an external circuit (not shown in the diagram), and oxygen gas supplied from the outside is reduced to produce water.

The first catalyst layer (25) according to the present invention may include a first layer (20) and a second layer (30). The second layer (30) may be disposed on the first layer (20). Specifically, the second layer (30) may be disposed directly on the first layer (20) or may be integrated with the first layer (20). Here, the term "directly on" means that there is not any member interposed between the first layer (20) and the second layer (30). In other words, the second layer (30) may be disposed opposite to the polymer electrolyte membrane (10). Therefore, the first layer (20) may be disposed between the second layer (30) and the polymer electrolyte membrane (10). Furthermore, the first layer may be integrated with the polymer electrolyte membrane (10) in an irregular form.

The thickness of the first layer (20) according to the present invention may be 10 to 800 nm (nanometers) and may be preferably 30 to 500 nm (nanometers). When the thickness of the first layer (20) is less than the above-described numerical value range, an effect of enhancing the interface binding strength may not be obtained, and when the thickness exceeds the above-described numerical value range, the quantity of ionomers may become so large that there may be a problem of impeded mass transfer.

The thickness of the second layer (30) according to the present invention may be 0.5 to 20 μm (micrometers) and may be preferably 1 to 15 μm (micrometers). When the thickness of the second layer (30) is less than the above-described range, the loading amount of the electrode may be decreased, causing a reduction in the activity, and when the thickness exceeds the above-described numerical value range, mass transfer may not smoothly occur so that resistance may be increased while performance may be lowered.

The second catalyst layer (25') according to the present invention may include a third layer (20') and a fourth layer (30'). The fourth layer (30') may be disposed on the third layer (20'). Specifically, the fourth layer (30') may be disposed directly on the third layer (20'). Here, the term "directly on" means that there is not any member interposed between the third layer (20') and the fourth layer (30'). In other words, the fourth layer (30') may be disposed opposite to the polymer electrolyte membrane (10). Therefore, the third layer (20) may be disposed between the fourth layer (30') and the polymer electrolyte membrane (10).

The thickness of the third layer (20') according to the present invention may be 10 to 800 nm (nanometers) and may be preferably 30 to 500 nm (nanometers). When the thickness of the third layer (20') is less than the above-described numerical value range, an effect of enhancing the interface binding strength may not be obtained, and when the thickness may exceed the above-described numerical value range, the quantity of ionomers may become so large that there may be a problem of impeded mass transfer.

The thickness of the fourth layer (30') according to the present invention may be 0.5 to 20 μm (micrometers) and may be preferably 1 to 15 μm (micrometers). When the thickness of the fourth layer (30') is less than the above-described numerical value range, the loading amount of the electrode may be decreased, causing a reduction in the activity, and when the thickness exceeds the above-described numerical value range, mass transfer may not smoothly occur so that resistance may be increased while performance may be lowered.

In the present specification, the terms "first layer" through "fourth layer" are intended only to distinguish different layers for the convenience of description, and these layers may also be defined as various regions of the catalyst layers. Therefore, without being limited to the drawings, the first layer and the second layer may be integrated with each other to constitute the first catalyst layer, and the third layer and the fourth layer may be likewise integrated with each other to constitute the second catalyst layer.

The first and second catalyst layers (25, 25') according to the present invention may further contain a functional additive. The functional additive may be at least one selected from the group consisting of a radical scavenger, gas barrier particles, an hydrophilic inorganic additive, an Oxygen Evolution Reaction (OER) catalyst, and combinations thereof.

The radical scavenger may include one or more selected from the group consisting of a metal-based peroxide decomposition accelerator, an organic peroxide decomposition accelerator, and a peroxide decomposition accelerating salt compound.

The metal-based peroxide decomposition accelerator may include any one or more selected from the group consisting of cerium ion, nickel ion, tungsten ion, cobalt ion, chromium ion, zirconium ion, yttrium ion, manganese ion, iron ion, titanium ion, vanadium ion, molybdenum ion, lanthanum ion, neodymium ion, silver ion, platinum ion, ruthenium ion, palladium ion, and rhodium ion.

The metal-based peroxide decomposition accelerator may include oxide of a metal or a noble metal. The oxide of a metal or a noble metal may include any one or more selected from the group consisting of cerium oxide, nickel oxide, tungsten oxide, cobalt oxide, chromium oxide, zirconium oxide, yttrium oxide, manganese oxide, iron oxide, titanium oxide, vanadium oxide, molybdenum oxide, lanthanum oxide, and neodymium oxide.

The decomposition accelerating salt compound may include a salt of a metal including a transition metal or a noble metal, and the salt compound may be any one selected from the group consisting of carbonate, acetate, chloride, fluoride, sulfate, phosphate, tungstate, hydroxide, ammonium acetate, ammonium sulfate, acetylacetonate, and permanganate of the above-described metal. Specifically, examples of a salt of cerium include cerium carbonate, cerium acetate, cerium chloride, cerium acetate, cerium sulfate, cerium ammonium acetate, and cerium ammonium sulfate, and cerium acetylacetonate may also be included as an organic metal complex salt.

The organic peroxide decomposition accelerator may be one or more selected from the group consisting of syringic acid, vanillic acid, protocatechuic acid, coumaric acid, caffeic acid, ferulic acid, chlorogenic acid, cynarine, gallic acid, and mixtures of these.

The gas barrier particles may be any one selected from the group consisting of clay, montmorillonite, saponite, laponite, mica, fluorohectorite, kaolinite, vermiculite, and combinations thereof.

The hydrophilic inorganic additive may be at least any one selected from the group consisting of $SnO_2$, silica, alumina, zirconia, mica, zeolite, phosphotungstic acid, silicotungstic acid, zirconium hydrogen phosphate, and combinations thereof. The hydrophilic inorganic additive can prevent a phenomenon of lowering the conductivity of hydrogen ions under high-temperature low-humidity conditions.

The oxygen evolution reaction catalyst is micronized or uniformly dispersed within the catalyst layer and can improve the durability of the catalyst layer through an effective water decomposition reaction. The oxygen evolution reaction catalyst may contain an active substance of the following platinum-based metal and/or non-platinum-based metal.

As the platinum-based metal), platinum (Pt) and/or a Pt-M alloy can be used. The M may be any one or more selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh).

Specifically, as the Pt-M alloy, Pt—Pd, Pt—Sn, Pt—Mo, Pt—Cr, Pt—W, Pt—Ru, Pt—Ni, Pt—Ru—W, Pt—Ru—Ni, Pt—Ru—Mo, Pt—Ru—Rh—Ni, Pt—Ru—Sn—W, Pt—Ru—Ir—Ni, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, or a mixture of two or more of these can be used.

As the non-platinum metal, one or more selected from the group consisting of palladium (Pd), ruthenium (Ru), iridium (Ir), osmium (Os), and a non-platinum alloy can be used. As the non-platinum alloy, Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, Fe—N, Fe—P, Co—N, or a mixture of two or more of these can be used.

For the first catalyst layer (25) and the second catalyst layer (25'), any substance that can be used as a catalyst for a hydrogen gas oxidation reaction and/or an oxygen gas reduction reaction may be used, and preferably, a platinum-based metal and/or non-platinum-based metal such as described above can be used. Each of the first catalyst layer (25) and the second catalyst layer (25') according to the present invention may be a layer in which metal particles are supported on a support and used. The metal particles may be disposed on the surface of a support or may be caused to penetrate into the inner part of the support while filling the internal pores of the support.

The support may be a carbon-based support, a porous inorganic oxide such as zirconia, alumina, titania, or silica, or a zeolite. The carbon-based support may be selected from graphite, Super P, carbon fiber, carbon sheet, carbon black, Ketjen black, Denka black, Acetylene black, carbon nanotube (CNT), carbon sphere, carbon ribbon, fullerene, active carbon, carbon nanofiber, carbon nanowire, carbon nanoball, carbon nanohorn, carbon nanocage, carbon nanoring, ordered nano-/meso-porous carbon, carbon aerogel, mesoporous carbon, griffin, stabilized carbon, activated carbon, and combinations of one or more of these; however, the carbon-based support is not limited to these. Any support that can be used in the present technical field can be used without limitation.

The surface area of the support is preferably 50 $m^2/g$ or more, and the average particle size is preferably 10 to 300 nm (nanometers). When the surface area of the support is less than the above-described numerical value range, a uniform distribution of metal particles may not be obtained.

The first gas diffusion layer (40) according to the present invention may be disposed on the first catalyst layer (25). Specifically, the first gas diffusion layer (40) may be disposed opposite to the first layer (20), with the second layer (30) interposed therebetween. In other words, the first catalyst layer (25) may be disposed between the first gas diffusion layer (40) and the polymer electrolyte membrane (10).

The second gas diffusion layer (40') according to the present invention may be disposed on the second catalyst layer (25'). Specifically, the second gas diffusion layer (40') may be disposed opposite to the third layer (20'), with the fourth layer (30') interposed therebetween. In other words, the second catalyst layer (25') may be disposed between the second gas diffusion layer (40') and the polymer electrolyte membrane (10).

In each of the first gas diffusion layer (40) and the second gas diffusion layer (40'), a porous conductive base material can be used so that smooth supply of hydrogen gas or oxygen gas can be achieved. As a representative example thereof, carbon paper, carbon cloth, carbon felt, or metal cloth (a product in which a metal film is formed on the surface of a porous film composed of a cloth of fibrous metal or on the surface of a cloth formed from a polymer fiber) can be used; however, the porous conductive base material is not limited to these.

Furthermore, in the first gas diffusion layer (40) and the second gas diffusion layer (40'), it is preferable to use a layer that has been treated to have water repellency with a fluorine-based resin, from the viewpoint of preventing the reactant diffusion efficiency from being decreased by water generated at the time of operating the fuel cell. Regarding the fluorine-based resin, polytetrafluoroethylene, polyvinylidene fluoride, polyhexafluoropropylene, polyperfluoroalkyl vinyl ether, polyperfluorosulfonyl fluoride alkoxy vinyl ether, fluorinated ethylene propylene, polychlorotrifluoroethylene, or a copolymer of these can be used.

Figure 2:
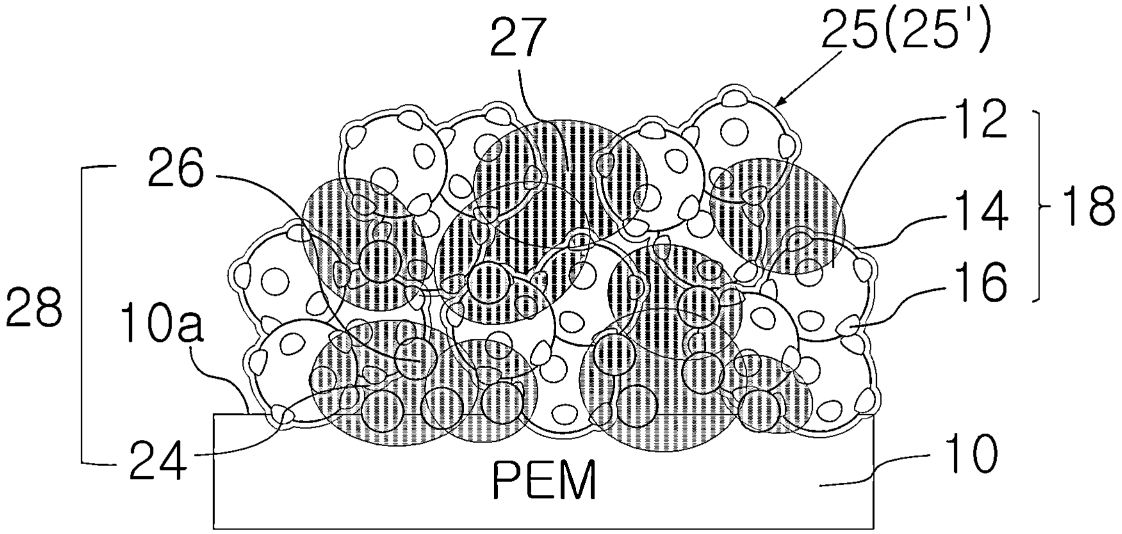
FIG. 2 is a schematic diagram showing the interface between a catalyst and a polymer electrolyte membrane according to an embodiment of the present invention.

FIG. 2 is a schematic diagram showing the interface between a catalyst and a polymer electrolyte membrane according to an embodiment of the present invention. Any description overlapping with the description given above will not be repeated or will be repeated only briefly.

The first and second catalyst layers (25, 25') according to the present invention may contain an ionomer in order to facilitate delivery of hydrogen ions and to improve the binding strength between the catalyst layer and the polymer electrolyte membrane (10).

Referring to FIG. 2, the first and second catalyst layers (25, 25') according to the present invention may contain a first composite (18) and a second composite (28).

The first composite (18) may contain a first catalyst (16) containing a support (12) and first metal particles supported on the support (12), and a first ionomer (14) coated on the surface of the first catalyst (16).

The second composite (28) may contain a second catalyst (26) that contains second metal particles and is not supported on a support, and a second ionomer (24) that is not coated on the surface of the second catalyst (26). In other words, the second catalyst (26) containing the second metal particles may be dispersed within the second ionomer (24).

The first metal particles and the second metal particles may be any one selected from the above-mentioned platinum-based metals and non-platinum-based metals. The first metal particles and the second metal particles may be identical with or different from each other.

The first and second catalyst layers (25, 25') according to the present invention may further contain a third ionomer (27). Specifically, the third ionomer (27) may be a free ionomer that exists freely alone without being bound to a catalyst and a support. The second ionomer (24) may also be a free ionomer that is not bound to a support, similarly to the third ionomer (27).

Referring to FIG. 1 and FIG. 2, the first layer (20) does not contain the third ionomer (27), or the content of the third ionomer per unit volume of the first layer (20) may be lower than the content of the third ionomer per unit volume of the second layer (30).

The first to third ionomers (14, 24, 27) may be each independently any one selected from the group consisting of a fluorine-based ionomer, a hydrocarbon-based ionomer, and a mixture of these. The first to third ionomers may have a configuration identical with or different from the configuration of the ion conductor of the above-described polymer electrolyte membrane (10). Therefore, the first ionomer (14) and the second ionomer (24) may be identical with or different from each other.

For example, any one of the first ionomer (14) and the second ionomer (24) may be a fluorine-based ionomer, and the other one may be a hydrocarbon-based ionomer. In another example, the first ionomer (14) may be a first hydrocarbon-based ionomer, and the second ionomer (24) may be a second hydrocarbon-based ionomer different from the first hydrocarbon-based ionomer.

For example, the first ionomer (14) and the second ionomer (24) may be different from each other. The equivalent weight (EW) of the first ionomer (14) and the equivalent weight of the second ionomer may be each independently 600 to 1100 g/eq. Therefore, the equivalent weight of the first ionomer (14) and the equivalent weight of the second ionomer (24) may be different from each other.

The equivalent weights (EW) of the second and third ionomers (24, 27) may be each 600 to 1100 g/eq, independently from the first ionomer (14).

The size of the second and third ionomers (24, 27) may be 10 to 1500 nm (nanometers) and may be preferably 30 to 800 nm (nanometers). When the sizes of the second second and third ionomers are outside the above-described numerical value range, mass transfer may be interrupted, or it may be difficult to regulate the position of formation of the first and third layers (20, 20').

The second and third ionomers (24, 27) may have any one form selected from the group consisting of a spherical shape, an ellipsoid shape, a rod shape, and a coil shape. Particularly, when the second and third ionomers (24, 27) have an ellipsoid shape and/or a rod shape, the effect of improving mass transfer may be further improved.

Referring to FIG. 1 and FIG. 2, the first and second catalyst layers (25, according to the present invention may be disposed on at least one surface (10*a*) of the polymer electrolyte membrane (10). Therefore, the first catalyst layer (25) according to the present invention may include a first layer (20) that is in contact with the polymer electrolyte membrane (10), and a second layer (30) disposed on the first layer (20). The second catalyst layer (25') according to the present invention may include a third layer (20') that is in contact with the polymer electrolyte membrane (10), and a fourth layer (30') disposed on the third layer (20').

The content of the first catalyst (16) according to the present invention may be 20% to 80% by weight with respect to the total weight of the first catalyst layer (25), and similarly, the content of the second catalyst (26) may be 20% to 80% by weight with respect to the total weight of the second catalyst (25'). When the content of the catalyst is less than the above-described numerical value range, performance may be deteriorated, and when the content exceeds the numerical value range, the active area is reduced due to aggregation of the catalyst, and the catalytic activity may be deteriorated.

The first layer (20) may contain the second composite (28). The second layer (30) does not contain the second composite (28), or the content of the second composite per unit volume of the second layer (30) may be lower than the content of the second composite per unit volume of the first layer (20). Similarly, the fourth layer (30') does not contain the second composite (28), or the content of the second composite per unit volume of the fourth layer (30') may be lower than the content of the second composite per unit volume of the third layer (20').

The second composite (28) may be included in the first and second catalyst layers (25, 25') in an irregular form.

Since the first and third layers (20, 20') according to the present invention are such that the content per unit volume of the free ionomer that exists relatively freely is larger than the content in the second and fourth layers (30, 30'), the interface binding strength between the polymer electrolyte membrane (10) and the first and second catalyst layers (25, 25') and the durability can be improved. As the interface binding strength is improved, the interface durability can increase, and mass transfer of hydrogen ions and the like can occur easily.

Furthermore, in the first composite (18) according to the present invention, the durability of the first and second catalyst layers (25, 25') can be improved by separating a catalyst that is relatively weakly bound to the support and a catalyst that is not bound to a support as catalysts that are not supported, and leaving a catalyst that has formed relatively strong bond to the support as a catalyst supported on a support.

Figure 3:
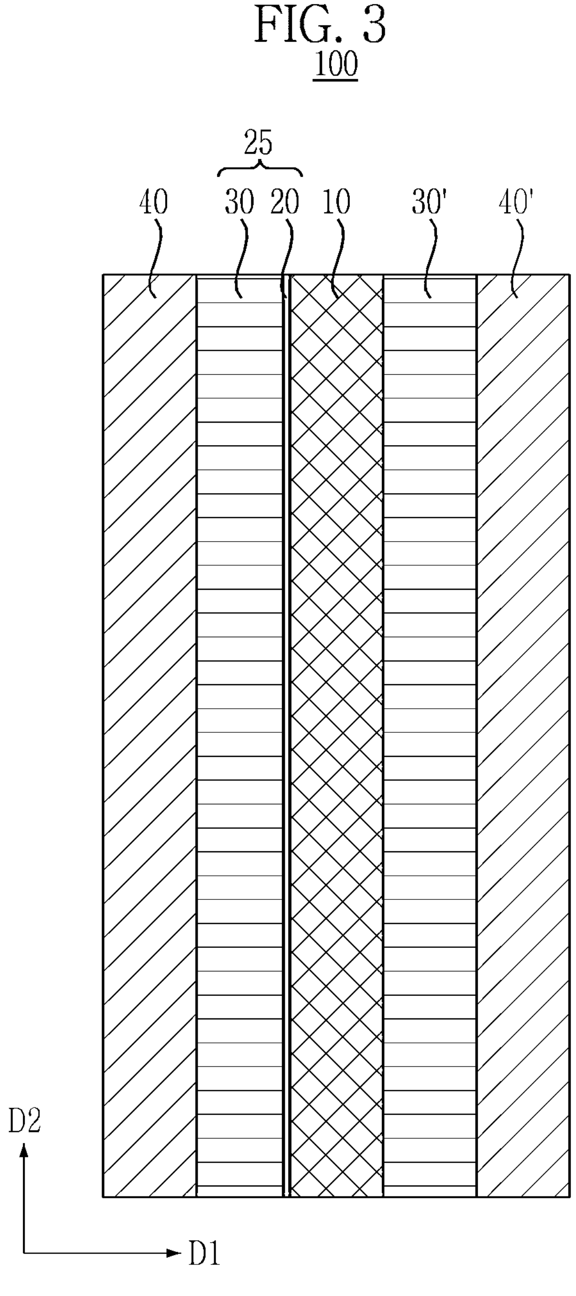
FIG. 3 is a cross-sectional view showing the membrane-electrode assembly according to an embodiment of the present invention.

FIG. 3 is a cross-sectional view showing a membrane-electrode assembly according to an embodiment of the present invention. Any description overlapping with the description given above will not be repeated or will be repeated only briefly.

Referring to FIG. 3, the polymer electrolyte membrane (10) may be disposed between the first catalyst layer (25) and the second catalyst layer (25'), and the first catalyst layer (25) may not have a double-layer structure.

Figure 4:
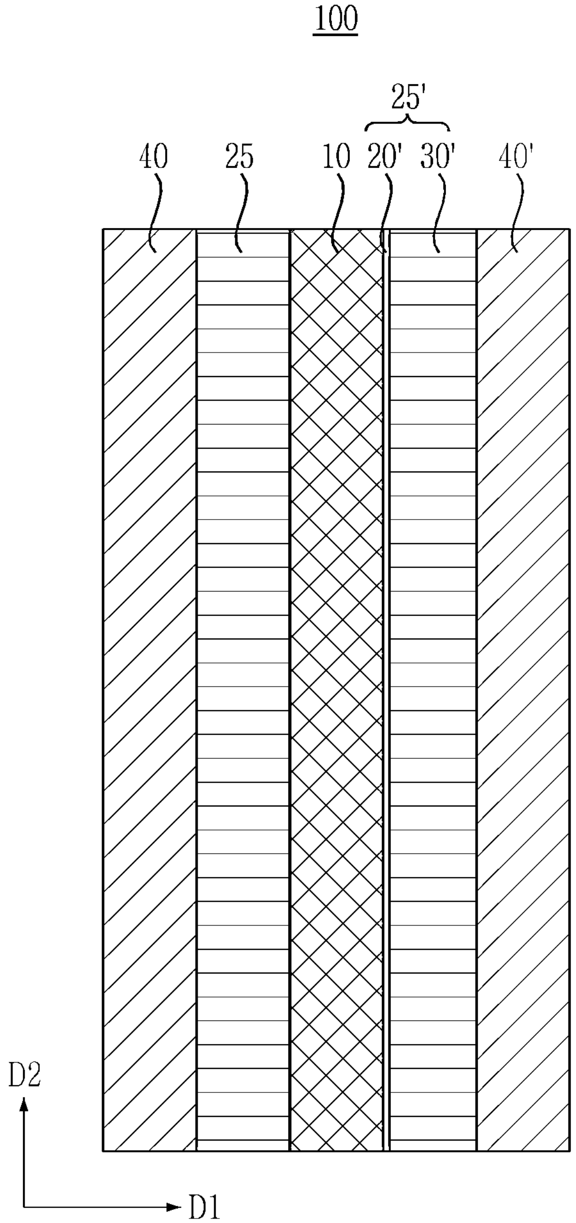
FIG. 4 is a cross-sectional view showing the membrane-electrode assembly according to another embodiment of the present invention.

FIG. 4 is a cross-sectional view showing a membrane-electrode assembly according to another embodiment of the present invention. Any description overlapping with the description given above will not be repeated or will be repeated only briefly.

Referring to FIG. 4, the polymer electrolyte membrane (10) may be disposed between the first catalyst layer (25) and the second catalyst layer (25'), and the second catalyst layer (25') may not have a double-layer structure.

Figure 5:
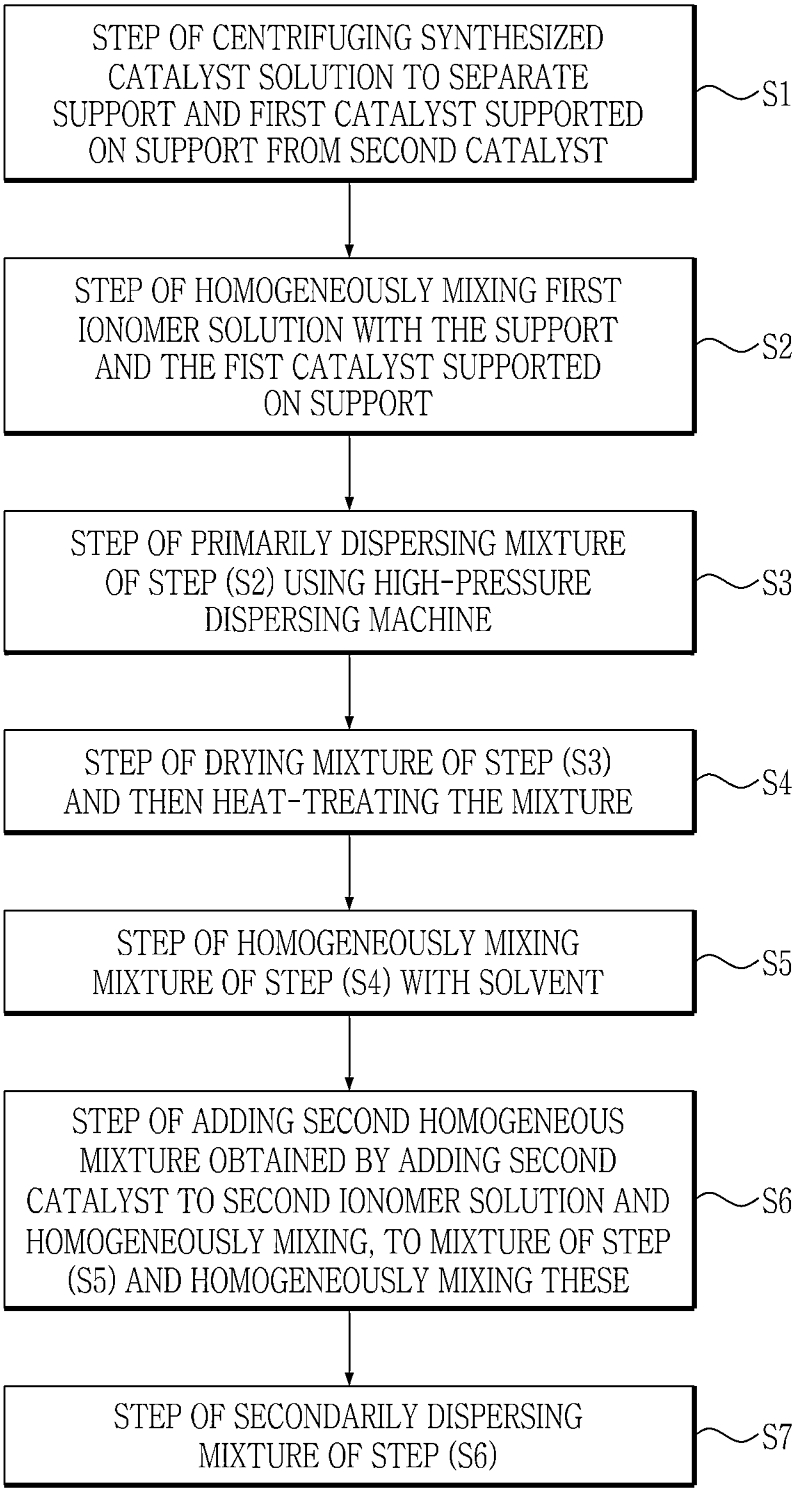
FIG. 5 is a flow chart showing a step of producing a coating composition for forming a catalyst layer according to an embodiment of the present invention.

FIG. 5 is a flow chart showing a method for producing a catalyst layer for direct coating according to an embodiment of the present invention.

The method for producing a catalyst layer for direct coating according to an embodiment of the present invention may include: a step (S1) of centrifuging a synthesized catalyst solution or a solution in which a produced catalyst is dispersed, to separate a support and a first catalyst supported on the support from a second catalyst that is not supported on a support; a step (S2) of homogeneously mixing a first ionomer solution with the support and the first catalyst supported on the support; a step (S3) of primarily dispersing the mixture of the step (S2) by using a high-pressure dispersing machine; a step (S4) of drying the mixture of the step (S3) and then heat-treating the mixture; a step (S5) of homogeneously mixing the mixture of the step (S4) with a solvent; a step (S6) of adding a second homogeneous mixture inn which the second catalyst is added to a second ionomer solution and homogeneously mixed, and homogeneously mixing these components to form a third homogeneous mixture; and a step (S7) of secondarily dispersing the mixture of the step (S6) to form a coating composition.

Specifically, the step (S1) may be a step of putting a synthesized catalyst solution into a centrifugal vessel, and then separating the synthesized catalyst solution at a rate of 10,000 to 30,000 rpm into a support as well as a first catalyst supported on the support and a second catalyst that is not supported on a support. The synthesized catalyst solution may be in a state in which a support and a first catalyst supported on the support are randomly mixed with a second catalyst that is not supported on a support. For example, the synthesized catalyst solution may be a solution obtained by putting a commercially available Pt/C catalyst into a reaction vessel and wetting the catalyst with water.

Specifically, the step (S2) may be a step of putting 20% to 40% by weight of a first ionomer solution with respect to the total weight of the coating composition into a vessel and homogeneously mixing the first ionomer solution with the support and the first catalyst supported on the support.

Specifically, the step (S3) may be a step of forming a first composite by coating the first ionomer on the surface of the first catalyst by using a homogeneous mixer. The step (S3) may be a step of primarily dispersing the synthesized catalyst solution containing the first composite by using a high-pressure dispersing machine.

Specifically, the step (S4) may include a step of drying the mixture of the step (S3) at 80° C. to 120° C. for 3 to 8 hours. When the temperature of the drying step is less than the above-described numerical value range or the drying time is less than the above-described numerical value range, a sufficiently dried catalyst layer may not be formed. When the drying temperature exceeds the above-described numerical value range or the drying time exceeds the above-described numerical value range, the duration of the process becomes unnecessarily long, and cracks and the like may be generated in the catalyst layer.

In the drying step, various drying methods such as hot air drying, vacuum drying, and infrared (IR) drying can be applied to the drying step. The temperature and time for drying can be appropriately regulated according to the boiling point of the solvent used.

Additionally, the step (S4) may include a step of heat-treating the resultant of the drying step at 80° C. to 120° C. for 3 to 10 hours. When the temperature range and time range of the heat treatment step are outside the above-described numerical value ranges, binding between the first catalyst and the first ionomer may not be strengthened.

Specifically, the step (S5) may be a step of homogenously mixing the mixture of the step (S4) with a solvent. The solvent may be a solvent selected from the group consisting of water, a hydrophilic solvent, an organic solvent, and a mixture of two or more of these.

The hydrophilic solvent may have one or more functional group selected from the group consisting of an alcohol containing a linear or branched saturated or unsaturated hydrocarbon having 1 to 12 carbon atoms, a ketone, an aldehyde, a carbonate, a carboxylate, a carboxylic acid ether, and an amide, and these may contain an aliphatic or aromatic cyclic compound in at least a portion of the main chain. The alcohol may be, for example, methanol, ethanol, isopropyl alcohol, ethoxyethanol, n-propyl alcohol, butyl alcohol, 1,2-propanediol, 1-pentanol, 1,5-pentanediol, or 1,9-nonanediol; the ketone may be heptanone or octanone; the aldehyde may be benzaldehyde or tolualdehyde; the ester may be methyl pentanoate or ethyl-2-hydroxypropanoate; the carboxylic acid may be pentanoic acid or heptanoic acid; the ether may be methoxybenzene or dimethoxypropane; and the amide may be propanamide, butylamide, or dimethylacetamide.

The organic solvent can be selected from N-methylpyrrolidone, dimethyl sulfoxide, tetrahydrofuran, and a mixture of two or more of these.

The content of the solvent may be 80% to 95% by weight, and preferably 85% to 93% by weight, with respect to the total weight of the coating composition. When the content of the solvent is less than the above-described numerical value range, the solid content may be too high, and there may be problems of cracking at the time of forming the catalyst layer and poor dispersion caused by high viscosity. When the content of the solvent exceeds the above-described numerical value range, the activity of the catalyst layer may be disadvantageous.

Specifically, the step (S6) may be a step of adding 1% to 20% by weight of the second catalyst and 0.1% to 10% by weight of the second ionomer solution with respect to the total weight of the coating composition and homogeneously mixing these.

Specifically, the step (S7) may be a step of secondarily dispersing the second ionomer solution in the mixture of the step (S6) by using any one method selected from the group consisting of a homogeneous mixer, a high-pressure dispersing machine, a ball mill, a powder mixer, a resonant acoustic mixer. The step (S7) may be a step of forming a second composite in the form in which the second catalyst is dispersed in the second ionomer.

Additionally, the step (S7) may further include a step of adding a functional additive to the mixture of the step (S6). The functional additive may be added at a proportion of 0.05% to 20% by weight with respect to the total weight of the coating composition.

Furthermore, the step (S7) may additionally include a step of forming a third ionomer. In the present specification, the third ionomer may be a free ionomer derived from the second ionomer solution.

Another embodiment of the present invention may be a method for producing a membrane-electrode assembly by using the above-described method for producing a catalyst layer for direct coating.

The method for producing a membrane-electrode assembly according to the present invention may include a step of providing a polymer electrolyte membrane, a step of directly coating at least one surface of the polymer electrolyte membrane with the coating composition, and a step of drying the polymer electrolyte membrane coated with the coating composition.

Specifically, when the coating composition is coated on one surface of the polymer electrolyte membrane and then subjected to a drying step, the second composite infiltrates into gaps between the coated catalyst, and a first layer or a third layer can be formed between the polymer electrolyte membrane and the catalyst layer. Therefore, the first layer or the third layer may have a relatively larger content of the ionomer per unit volume than the second layer or the fourth layer, respectively. Therefore, the first layer or the third layer may be an ionomer-rich layer.

Therefore, as the ionomer-rich layer is disposed at the interface between the polymer electrolyte membrane and the catalyst layer, the binding strength between the polymer electrolyte membrane and the catalyst layer can be improved. As a result, the durability of the membrane-electrode assembly can be improved.

Figure 6:
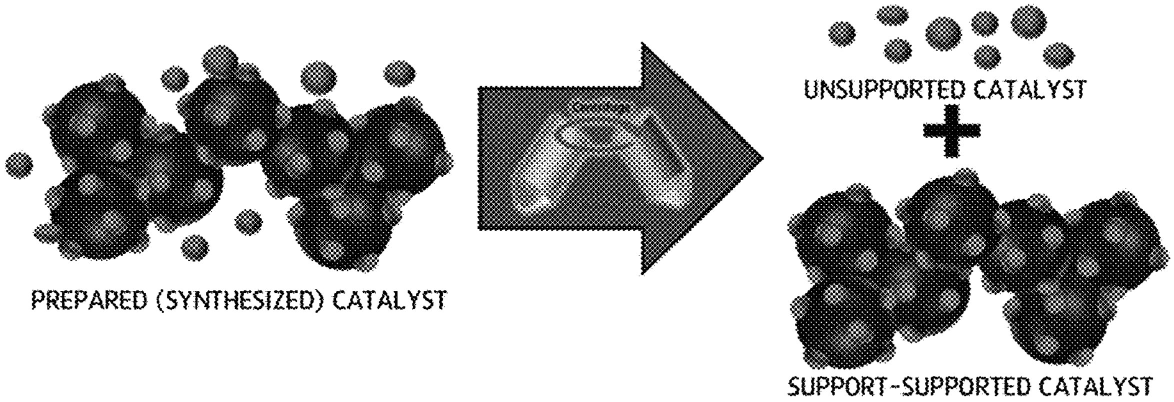
FIG. 6 is a schematic diagram showing a step of separating a synthesized catalyst into a support-supported catalyst and an unsupported catalyst by centrifugal separation.

FIG. 6 is a schematic diagram showing a step of separating the synthesized catalyst into a support-supported catalyst and an unsupported catalyst by centrifugal separation. Any description overlapping with the description given above will not be repeated or will be given only briefly.

Referring to FIG. 6, the synthesized catalyst can be distinguished into an unsupported catalyst and a support-supported catalyst in the step (S1) by using a centrifuge.

Figure 7:
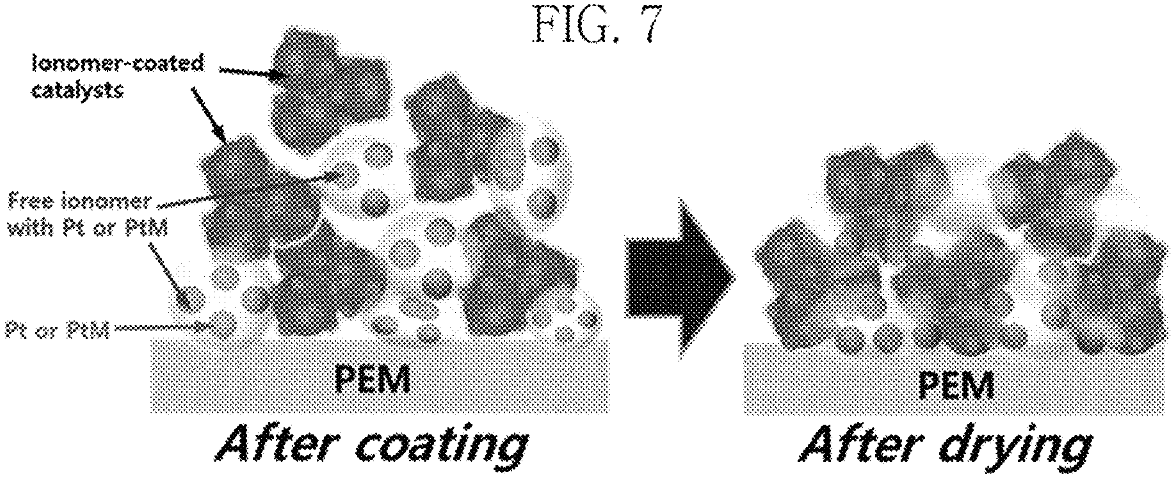
FIG. 7 is a schematic diagram showing a step of coating a polymer electrolyte membrane with a coating composition according to the present invention for forming a catalyst layer, and drying the coating composition.

FIG. 7 is a schematic diagram showing a step of coating the coating composition for forming a catalyst layer according to the present invention on the polymer electrolyte membrane and drying the coating composition.

Referring to FIG. 7, the second composite that contains platinum (Pt) or a platinum-metal alloy (Pt-M) dispersed in a free ionomer through the drying step may infiltrate into one surface of the polymer electrolyte membrane.

The step of drying the coating composition may be a step of drying at to 120° C. for 3 to 10 hours. When the temperature of the drying step is less than the above-described numerical value range or the drying time is less than the above-described numerical value range, a sufficiently dried catalyst layer may not be formed. When the drying temperature exceeds the above-described numerical value range or the drying time exceeds the above-described numerical value range, the process time may become unnecessarily long, and cracks and the like may be generated in the catalyst layer.

In the drying step, various drying methods such as hot air drying, vacuum drying, and infrared (IR) drying may be applied to the drying step. The temperature and time for drying can be appropriately regulated according to the boiling point of the solvent used.

Figure 8:
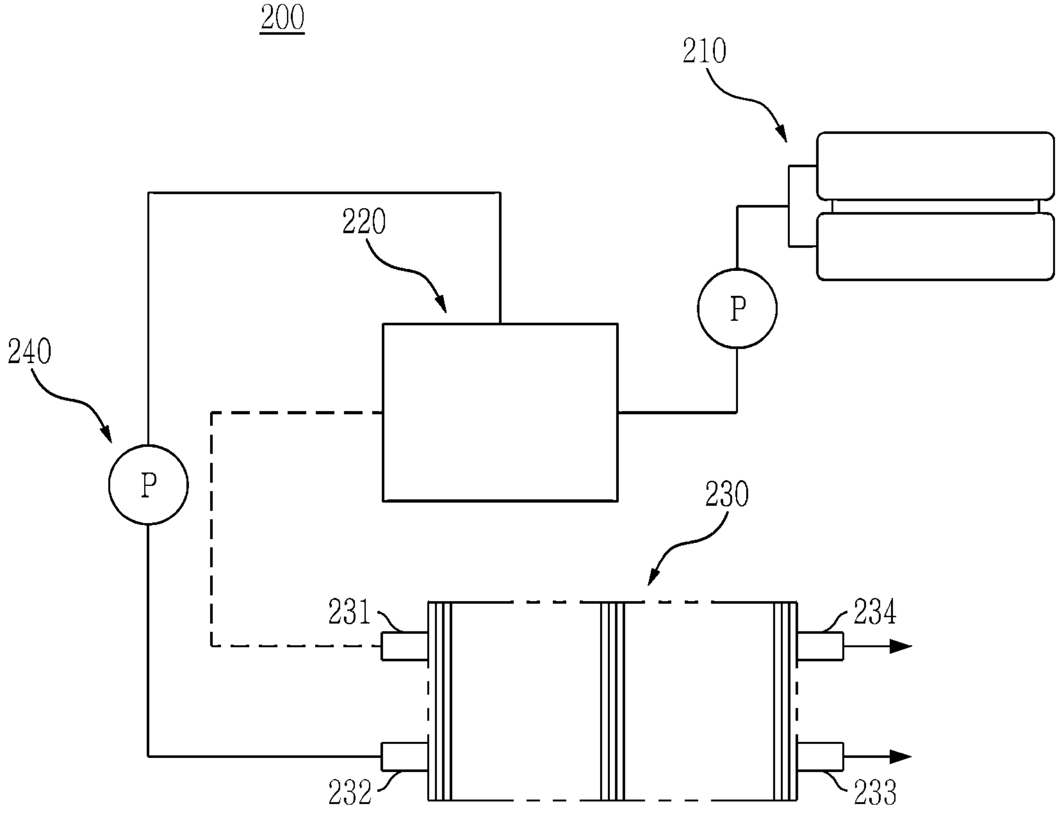
FIG. 8 is a schematic diagram for explaining a fuel cell according to an embodiment of the present invention.

FIG. 8 is a schematic diagram for explaining a fuel cell according to an embodiment of the present invention.

Referring to FIG. 8, another embodiment of the present invention may be a fuel cell including the above-described membrane-electrode assembly.

The fuel cell (200) according to the present invention may include a fuel supply unit (210) that supplies a mixed fuel obtained by mixing fuel and water; a reforming unit (220) that reforms the mixed fuel to produce a reformed gas including hydrogen gas; a stack (230) in which the reformed gas including hydrogen gas that is supplied from the reforming unit undergoes an electrochemical reaction with an oxidizing agent to generate electrical energy; and an oxidizing agent supply unit (240) that supplies an oxidizing agent to the reforming unit (220) and the stack (230).

The stack (230) may be equipped with a plurality of unit cells that induce an oxidation/reduction reaction of the reformed gas including hydrogen gas supplied from the reforming unit (220) and an oxidizing agent that is supplied from the oxidizing agent supply unit (240) and generate electrical energy.

Each unit cell means a unit cell that generates electricity, and a unit cell may include the above-described membrane-electrode assembly that oxidizes/reduces the reformed gas including hydrogen gas and oxygen in the oxidizing agent; and a separating plate (also referred to as bipolar plate; hereinafter, referred to as separating plate) for supplying the reformed gas including hydrogen gas and an oxidizing agent to the membrane-electrode assembly. The separating plate is disposed on both sides of the membrane-electrode assembly at the center. At this time, the separating plates disposed on the respective outermost sides of the stack may be specially referred to as end plates.

One of the end plates among the separating plates may be equipped with a pipe-shaped first supply tube (231) for injecting the reformed gas including hydrogen gas that is supplied from the reforming unit (220), and a pipe-shaped second supply tube (232) for injecting oxygen gas, while the other end plate may be equipped with a first discharge tube (233) for discharging the reformed gas including hydrogen gas that finally remains unreacted in a plurality of unit cells to the outside, and a second discharge tube (234) for discharging the oxidizing agent that finally remains unreacted in the above-described unit cells to the outside.

Since the separators constituting the electricity generating unit, the fuel supply unit, and the oxidizing agent supply unit in the above-described fuel cells are those used in conventional fuel cells, a detailed description will not be repeated in the present specification.

Hereinafter, Examples of the present invention will be described in detail so that those having ordinary skill in the art to which the present is pertained can easily carry out the invention; however, these configurations are given for illustrative purposes only, and the scope of rights of the present invention is not limited by the following description.

Production Example: Production of Membrane-Electrode Assembly

Membrane-electrode assemblies according to Examples and Comparative Example were produced as shown in the following Table 1.

Comparative Example 1

10 g of a commercially available Pt/C catalyst manufactured by Tanaka Holdings Co., Ltd. was introduced into a reaction vessel and wetted with water to produce a synthesized catalyst solution. 40 g of an amorphous first ionomer solution (10 wt %) was introduced into the reaction vessel and dispersed using a homogeneous mixer and a high-pressure dispersing machine to produce a dispersion mixture. The catalyst surface was coated with the first ionomer through the dispersion step. As a result, both surfaces of a polymer electrolyte membrane were coated with a coating composition containing a first composite in which the catalyst surface was coated with the first ionomer, and a membrane-electrode assembly was produced.

Example 1

10 g of a commercially available Pt/C catalyst manufactured by Tanaka Holdings Co., Ltd. was introduced into a reaction vessel and wetted with water to produce a synthesized catalyst solution. The synthesized catalyst solution was introduced into a centrifugal vessel, and a support and a first catalyst supported on the support were separated from a second catalyst (unsupported catalyst) that was not supported on a support, at a rate of 20,000 rpm.

30 g of a first ionomer solution (10 wt %) was introduced into a reaction vessel, and 9 g of the first catalyst supported on a support was dispersed in 200 g of water. The first ionomer solution (EW725) and the dispersion mixture were homogeneously mixed and then primarily dispersed using a high-pressure dispersing machine. The first ionomer was coated on the surface of the first catalyst through the above-described primary dispersion step, and a first composite could be formed. The solution containing the first composite was dried at 80° C. for 8 hours and then heat-treated at 120° C. for 2 hours to be homogeneously mixed with the solvent. 1 g of a second catalyst (unsupported catalyst) that was not supported on a support and 10 g of a second ionomer (EW725) solution (10 wt %) were added to the mixture that had been subjected to the homogeneous mixing step, and the mixture was homogeneously mixed to form a second composite. Thereafter, the homogeneous mixture was secondarily dispersed by using a high-pressure dispersing machine, and a coating composition was produced. Both surfaces of a polymer electrolyte membrane were directly coated with the coating composition, and then the coating composition was subjected to a drying step at 90° C. for 5 minutes. Thus, a membrane-electrode assembly including a catalyst layer formed from the above-described composition was produced.

Example 2

A membrane-electrode assembly was produced in the same manner as in Example 1, except that 0.1 g of cerium nitrate, which is a radical scavenger, was added to the second composite.

Example 3

A membrane-electrode assembly was produced in the same manner as in Example 1, except that the equivalent weight of the first ionomer was 725 g/eq, and the equivalent weight of the second ionomer was 800 g/eq.

Figure 9:
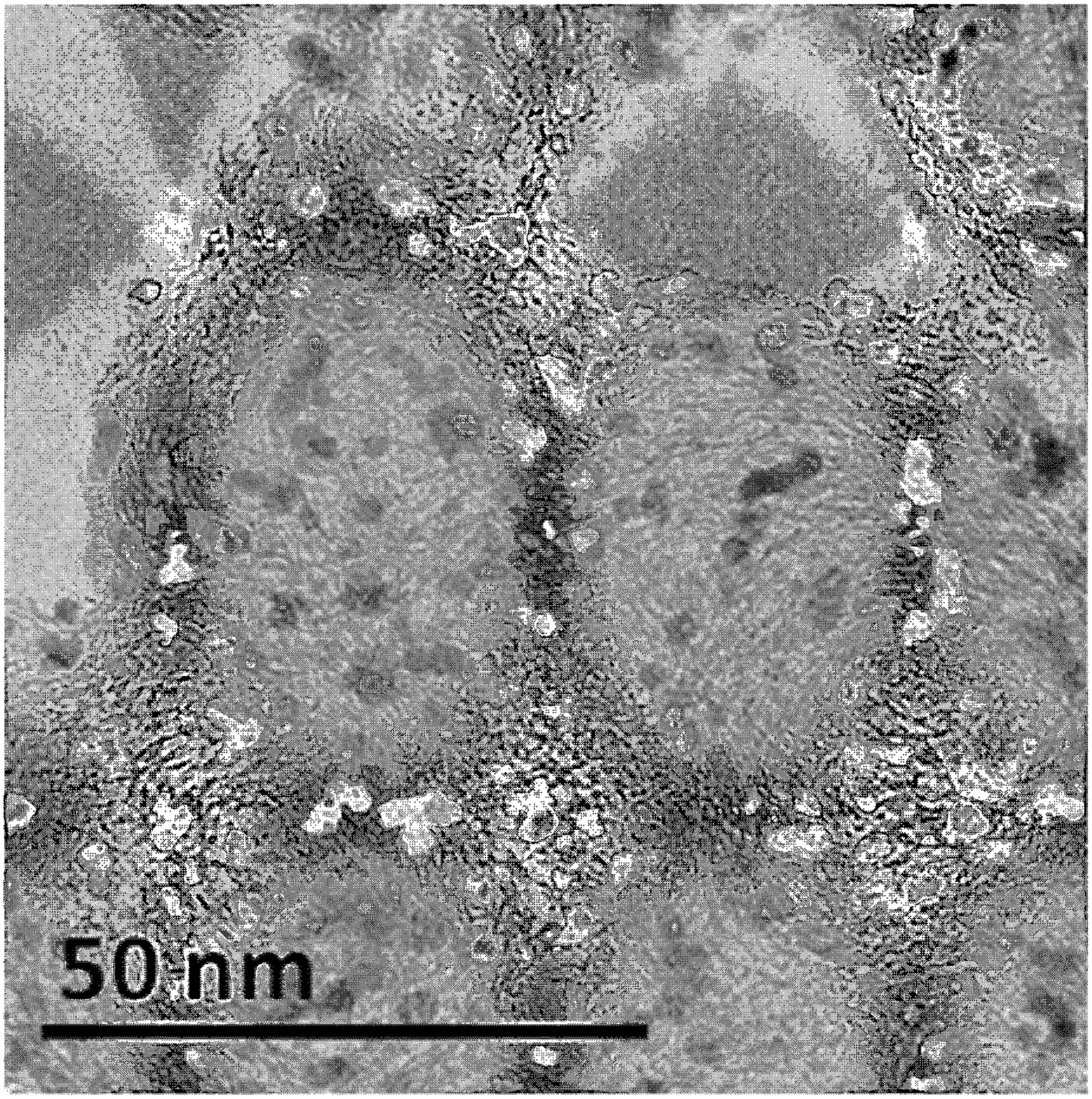
FIG. 9 is a Transmission Electron Microscope (TEM) photograph of a first catalyst supported on a support according to an embodiment of the present invention.
Figure 10:
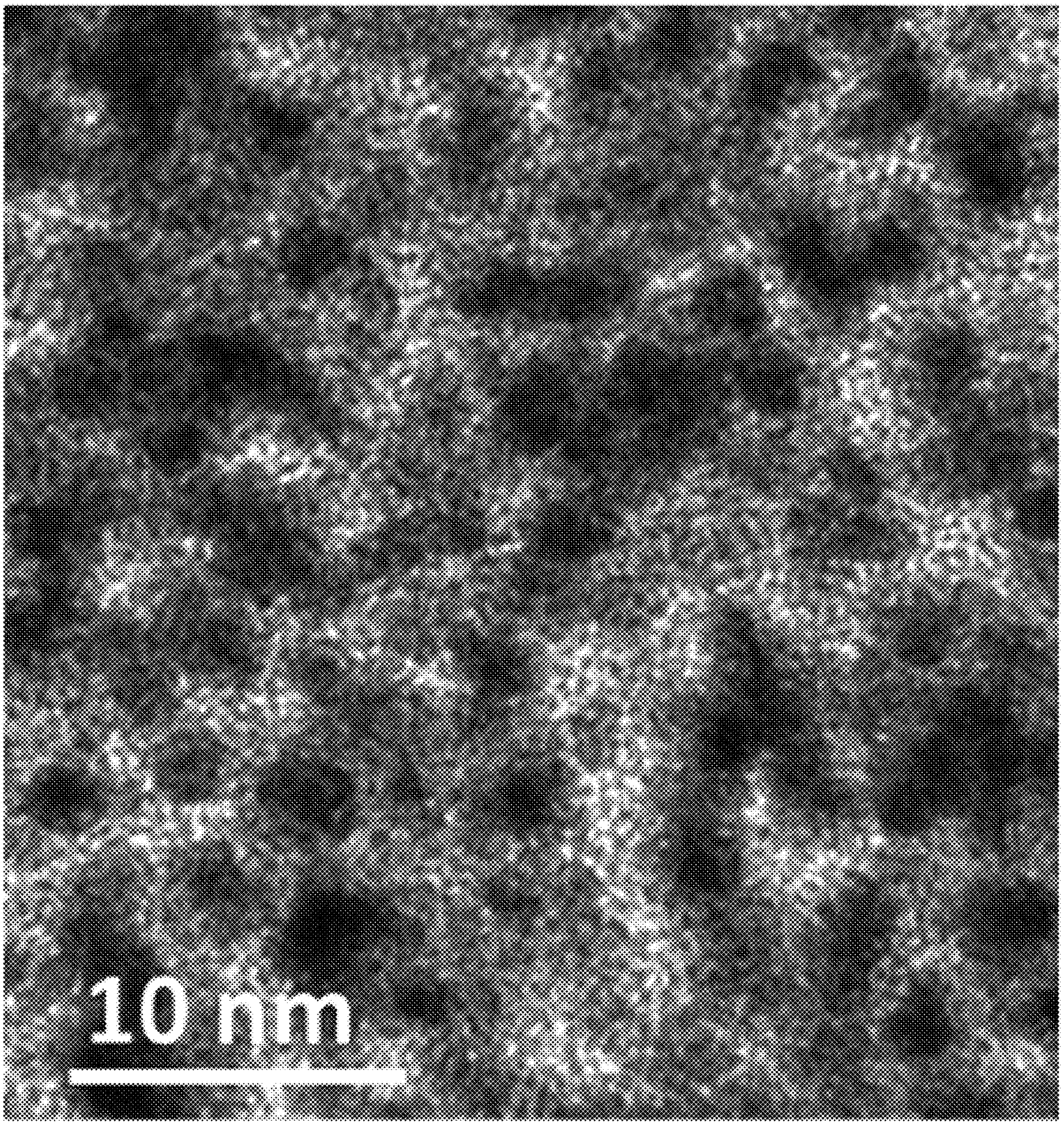
FIG. 10 is a Transmission Electron Microscope (TEM) photograph of a second catalyst that is not supported on a support according to an embodiment of the present invention.

Experimental Example 1: TEM Photographs of First Catalyst and Second Catalyst Separated by Centrifugal Separation FIG. 9 is a Transmission Electron Microscope (TEM) photograph of a first catalyst supported on a support according to an embodiment of the present invention. FIG. 10 is a Transmission Electron Microscope (TEM) photograph of a second catalyst that is not supported on a support according to an embodiment of the present invention.

Referring to FIG. 9 and FIG. 10, it could be observed that the synthesized catalyst was separated into a first catalyst and a second catalyst by centrifugal separation.

Figure 11:
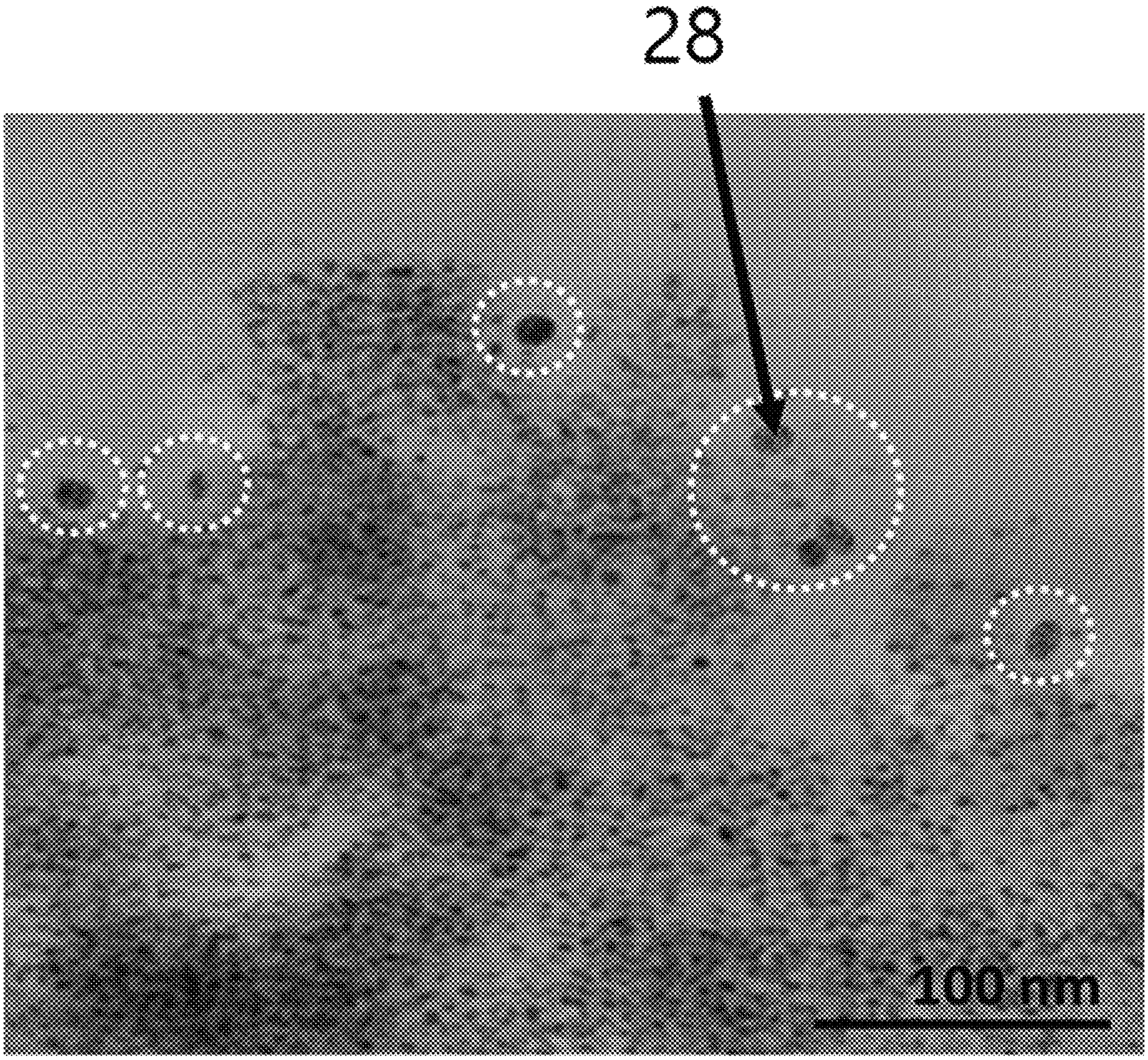
FIG. 11 is a Transmission Electron Microscope (TEM) photograph observing the interface of a catalyst layer and a polymer electrolyte membrane according to an embodiment of the present invention.
Figure 12:
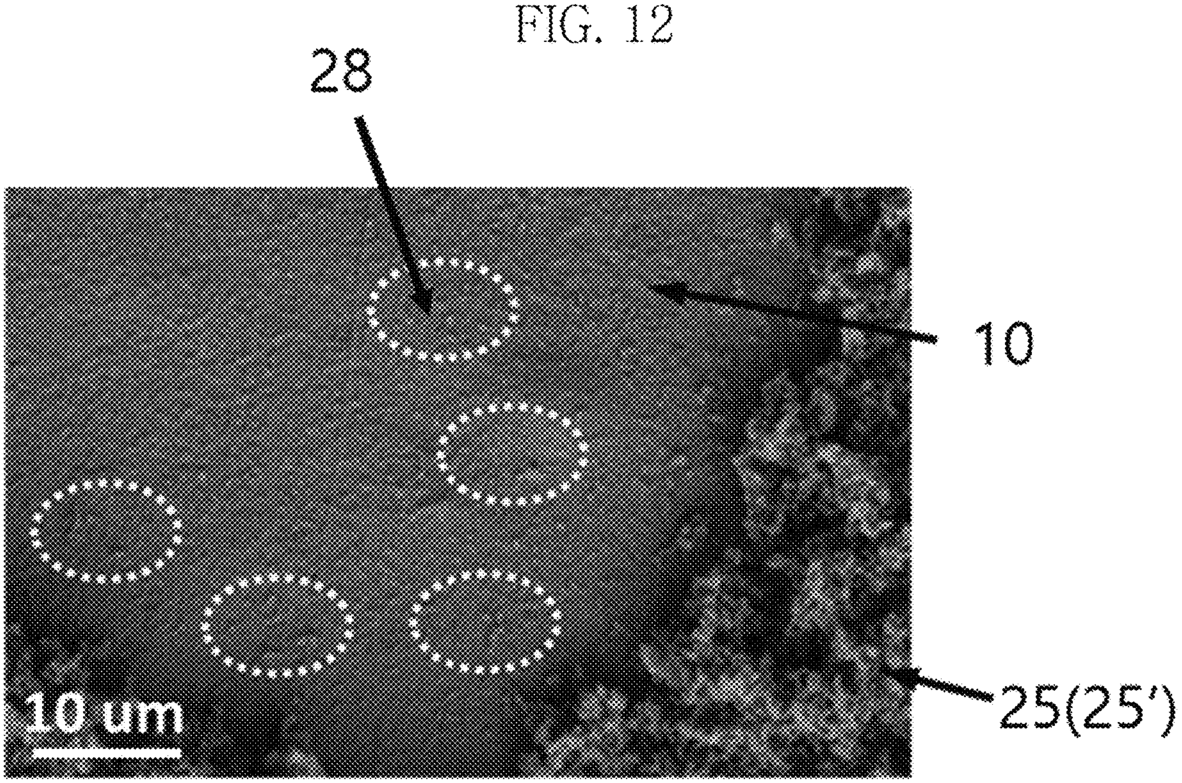
FIG. 12 is a Transmission Electron Microscope (TEM) photograph observing the interface of a catalyst layer and a polymer electrolyte membrane according to an embodiment of the present invention.

Experimental Example 2: TEM Photograph of Catalyst Layer-Polymer Electrolyte Membrane Interface FIG. 11 is a Transmission Electron Microscope (TEM) photograph obtained by observing the interface between the catalyst layer and the polymer electrolyte membrane according to an embodiment of the present invention. FIG. 12 is a Transmission Electron Microscope (TEM) photograph obtained by observing the interface between the catalyst layer and the polymer electrolyte membrane according to an embodiment of the present invention.

Referring to FIG. 11, it could be observed that the second composite (28) according to the present invention was disposed at the interface between the catalyst layer and the polymer electrolyte membrane.

Referring to FIG. 12, it can be seen that the second composite (28) is (28) irregularly arranged between the interfaces of the first and second catalyst layers (25, 25') and the polymer electrolyte membrane (10).

Experimental Example 3: Tensile Evaluation of Membrane-Electrode Assembly

Figure 13:
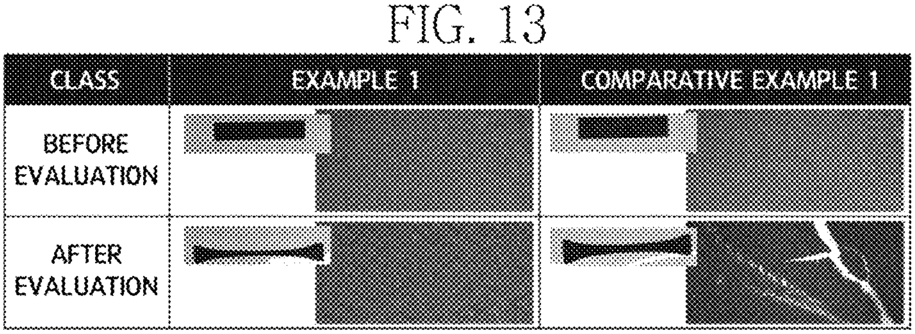
FIG. 13 is microscopic photographs of electrode surfaces before and after a tensile evaluation in the membrane-electrode assemblies according to Example 1 and Comparative Example 1.

FIG. 13 is microscopic photographs of the electrode surfaces obtained before and after a tensile evaluation in the membrane-electrode assemblies according to Example 1 and Comparative Example 1.

Referring to the FIG. 13, the membrane-electrode assembly according to Example 1 exhibited a stable interface even after a tensile evaluation as compared with the membrane-electrode assembly according to Comparative Example 1, and detachment of the catalyst layer was hardly observed. On the other hand, the membrane-electrode assembly according to Comparative Example 1 exhibited a condition that the interface between the polymer electrolyte membrane and the catalyst layer was separated after a tensile evaluation, and the catalyst layer was detached.

Experimental Example 4: DOE Chemical Durability Evaluation Results OCV Reduction Rate

TABLE 1

| Sample | Comparative Example 1 | Example 1 | Example 2 | Example 3 |
|---|---|---|---|---|
| OCV voltage loss | 33% | 10% | 5% | 9% |

Chemical durability was evaluated according to the durability evaluation protocol (OCV holding, 90° C., H2/Air, 30% RH_AN/30% RH_CA, 50 kPa) of the Department of Energy (DOE) of the United States of America. Specifically, the OCV hold method was carried out for 500 hours for the evaluation of the chemical durability of the membrane-electrode assemblies, and then the voltage loss was measured. The measured values are shown in Table 1.

As shown in the Table 1, the membrane-electrode assemblies according to Examples 1 to 3 satisfied the DOE standards (voltage reduction A 20% @500 hr) and exhibited chemical durability with lower voltage loss, as compared with the membrane-electrode assembly according to Comparative Example 1.

From the evaluation results shown above, the membrane-electrode assemblies according to Examples 1 to 3 exhibited improved chemical durability as compared to Comparative Example 1.

Experimental Example 5: Microscopic Photograph of Electrode Surface of Membrane-Electrode Assembly FIG. 14 is Scanning Electron Microscope (SEM) photographs of electrode surfaces in the membrane-electrode assemblies according to Examples 1 and 3.

Figure 14:
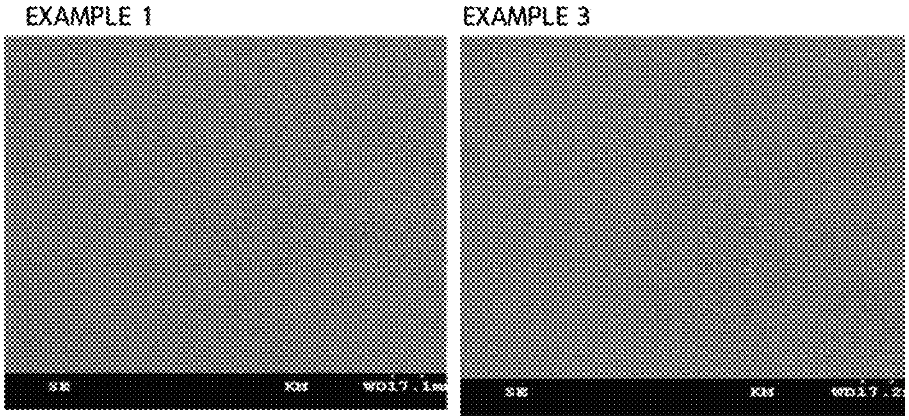
FIG. 14 is Scanning Electron Microscope (SEM) photographs of electrode surfaces in the membrane-electrode assemblies according to Example 1 and Example 3.

As shown in FIG. 14, the electrode surfaces of the membrane-electrode assemblies according to Examples 1 and 3 substantially had no significant differences in the external appearance and performance.

Preferred embodiments of the present invention have been described n detail above; however, the scope of rights of the present invention is not limited to these, and it should be noted that various modifications and improvements made by an ordinarily skilled person using the basic concept of the present invention as defined in the following claims are also included in the scope of rights of the present invention.

The invention claimed is:

1. A membrane-electrode assembly comprising:

a polymer electrolyte membrane; and a catalyst layer disposed on at least one surface of the polymer electrolyte membrane, wherein the catalyst layer contains a first composite and a second composite, the first composite contains a support, a first catalyst that contains first metal particles and is supported on the support, and a first ionomer coated on a surface of the first catalyst, the second composite contains a second catalyst that contains second metal particles and is not supported on a support, and a second ionomer that is not coated on a surface of the second catalyst, and the first ionomer and the second ionomer are identical with or different from each other, wherein the catalyst layer includes:
a first layer that is in contact with the polymer electrolyte membrane; and
a second layer disposed on the first laver, and
the first layer contains the second composite,
wherein the first layer has a thickness of 10 nm to 800 nm (nanometers), and the second layer has a thickness of 0.5 μm to 20 μm (micrometers).

2. The membrane-electrode assembly according to claim 1,
wherein the first ionomer and the second ionomer are different from each other.

3. The membrane-electrode assembly according to claim 2,
wherein an equivalent weight (EW) of the first ionomer and an equivalent weight of the second ionomer are each independently 600 to 1100 g/eq, and
the equivalent weight of the first ionomer and the equivalent weight of the second ionomer are different from each other.

4. The membrane-electrode assembly according to claim 2,
wherein any one of the first ionomer and the second ionomer is a fluorine-based ionomer, and the other is a hydrocarbon-based ionomer.

5. The membrane-electrode assembly according to claim 2,
wherein the first ionomer is a first hydrocarbon-based ionomer, and
the second ionomer is a second hydrocarbon-based ionomer different from the first hydrocarbon-based ionomer.

6. The membrane-electrode assembly according to claim 1,
wherein the second ionomer has a size of 10 to 1500 nm (nanometers).

7. The membrane-electrode assembly according to claim 1,
wherein the second layer does not contain the second composite, or
a content of the second composite per unit volume of the second layer is lower than a content of the second composite per unit volume of the first layer.

8. The membrane-electrode assembly according to claim 1,
wherein the catalyst layer further contains a third ionomer, and
the first layer does not contain the third ionomer, or
a content of the third ionomer per unit volume of the first layer is lower than a content of the third ionomer per unit volume of the second layer.

9. The membrane-electrode assembly according to claim 1,
wherein the catalyst layer further contains a functional additive.

10. The membrane-electrode assembly according to claim 9,
wherein the functional additive is at least one selected from the group consisting of a radical scavenger, gas barrier particles, a hydrophilic inorganic additive, an oxygen evolution reaction (OER) catalyst, and a combination of these.

11. A fuel cell comprising the membrane-electrode assembly according to claim 1.

* * * * *